(12) United States Patent
Pudas et al.

(10) Patent No.: US 8,979,006 B2
(45) Date of Patent: Mar. 17, 2015

(54) BATTERY RECYCLING METHOD

(75) Inventors: Jarmo Pudas, Nivala (FI); Arto Erkkila, Nivala (FI); Jarmo Viljamaa, Nivala (FI)

(73) Assignee: Akkuser, Ltd, Nivala (FI)

( * ) Notice: Subject to any disclaimer, the term of this patent is extended or adjusted under 35 U.S.C. 154(b) by 341 days.

(21) Appl. No.: 13/634,673

(22) PCT Filed: Mar. 16, 2011

(86) PCT No.: PCT/EP2011/053963
§ 371 (c)(1),
(2), (4) Date: Aug. 15, 2013

(87) PCT Pub. No.: WO2011/113860
PCT Pub. Date: Sep. 22, 2011

(65) Prior Publication Data
US 2013/0313345 A1    Nov. 28, 2013

Related U.S. Application Data

(60) Provisional application No. 61/314,258, filed on Mar. 16, 2010.

(51) Int. Cl.
*B02B 5/02* (2006.01)
*B02C 17/02* (2006.01)
*H01M 6/52* (2006.01)
*H01M 10/54* (2006.01)

(52) U.S. Cl.
CPC ............... *H01M 6/52* (2013.01); *H01M 10/54* (2013.01)
USPC .......................................... 241/24.14; 241/29

(58) Field of Classification Search
USPC ................... 241/29, 24.13, 24.14
See application file for complete search history.

(56) References Cited

U.S. PATENT DOCUMENTS

| | | | | |
|---|---|---|---|---|
| 4,775,107 A | * | 10/1988 | Heng et al. | 241/23 |
| 5,683,040 A | * | 11/1997 | Jakob et al. | 241/14 |
| 6,177,056 B1 | * | 1/2001 | Prengaman et al. | 423/199 |
| 8,210,456 B2 | * | 7/2012 | Stevens | 241/19 |

FOREIGN PATENT DOCUMENTS

| | | |
|---|---|---|
| CN | 2506363 Y | 8/2002 |
| DE | 4310862 A1 | 10/1994 |
| EP | 1148571 A1 | 10/2001 |
| EP | 1684369 A1 | 7/2006 |
| JP | 60156594 A | 8/1985 |
| JP | 62029072 A | 2/1987 |
| JP | 06346160 A | 12/1994 |
| JP | 10074539 A | 3/1998 |
| JP | 11191439 A | 7/1999 |
| JP | 2000054039 A | 2/2000 |
| JP | 2002224650 A | 8/2002 |
| WO | 9217791 A1 | 10/1992 |
| WO | 9419838 A1 | 9/1994 |

* cited by examiner

*Primary Examiner* — Faye Francis
(74) *Attorney, Agent, or Firm* — Nath, Goldberg & Meyer; Jerald L. Meyer

(57) ABSTRACT

A method for recycling discarded batteries by chopping or crushing to recover reusable materials, the method comprising the steps, sorting a plurality of batteries into groups by battery technology; removing button-cell batteries from said groups; chopping said groups of batteries into pieces approximately one quarter inch or less, to produce final particle matter; removing ferro-magnetic material form said final particulate matter; transferring said final particulate matter to refining or smelting process to recover to recover reusable materials.

3 Claims, No Drawings

BATTERY RECYCLING METHOD

CROSS-REFERENCE TO RELATED APPLICATIONS

This is a National Phase Application filed under 35 U.S.C. 371 as a national stage of PCT/EP2011/053963 filed on Mar. 16, 2011, an application claiming the benefit under 35 USC 119(e) U.S. Provisional Application No. 61/314,258 filed on Mar. 16, 2010, the content of each of which is hereby incorporated by reference in its entirety.

BACKGROUND OF THE INVENTION

Field of the Invention

The present invention generally relates to methods for recycling discarded batteries by recovering usable materials.

SUMMARY OF THE INVENTION

The rapid proliferation of portable electronic devices has resulted in a growing challenge as to how to cost effectively manage the disposal of batteries used to power these devices. The normal waste disposal infrastructure is not equipped to properly handle discarded batteries. Batteries contain materials and chemicals that, if allowed to leak into the environment, pose a significant threat. In addition, some battery technologies require materials that are costly to produce or are in limited supply. In many cases these materials may be recovered from the discards and reused, at considerable economic advantage. Battery recycling can provide both environmental and economic advantages. The practicality of battery recycling however is complicated by the large quantity of discarded batteries, the variety of battery sizes and physical configurations and battery technologies employing diverse chemical agents, elements and packaging materials.

A practical battery recycling process takes in a bulk load of discarded batteries of all types. As each battery type contains different materials, chemicals, and packaging components separate recycling should be employed for each battery type. The output of the battery recycling process is the various recyclable materials gathered into groupings suitable for recovery of the constituent compounds and materials by refining or other separation processing. The battery recycling process, by itself, should minimize harmful environmental impact.

In embodiments, there is disclosed a method for processing discarded batteries thereby separating the constituent materials and chemicals into concentrated groupings which are suitable for refining into reusable materials. The method begins with receiving the discarded batteries in bulk, sorting the discarded batteries in accordance with battery technology type, separately crushing each of the battery types using an appropriate method, and collecting concentrated groupings of constituent materials and chemicals. Each of the concentrated groupings may be submitted for smelting or refining there by recovering the reusable materials.

In embodiments there is provided a method for recycling batteries comprising: receiving a plurality of batteries; sorting the plurality of batteries into groups by battery technology; removing button-cell batteries from the groups; chopping the groups of batteries into pieces approximately one quarter inch or less to produce final particulate matter; removing ferro-magnetic material from the final particulate matter; transferring the final particulate matter to metal refiner; and preparing and outputting a report. In an embodiment for recycling Lithium-ion and Li-polymer batteries, the chopping further comprises: first chopping into pieces one inch or less wherein released gases are removed from the first chopping; and second chopping into pieces one quarter inch or less. In an embodiment for recycling Nickel-metal-hydride (Ni-MH) batteries, the chopping further comprises a single chopping or crushing into pieces one quarter inch or less. In an embodiment the removing ferro-magnetic material is performed using a magnetic separator. In a further embodiment, the removing button-cell batteries step is performed by passing them through a metal sieve.

DETAILED DESCRIPTION OF THE INVENTION

In embodiments, the battery recycling method is a multi-step process comprising receiving discarded batteries in bulk containers, sorting the received batteries into groups of like technology, separately chopping or crushing each of the groups of batteries, and submitting the resulting battery materials for refining or smelting. The refining or smelting operation recovers and purifies the recyclable materials.

Receiving

In an embodiment, the discarded batteries are received in unsorted bulk containers. The containers may contain a variety of battery types including but not limited to Lead acid, Li-Ion, Polymer, Ni—Cd; Mercury, Ni-Mh, Lithium primary and Alkaline. In addition the containers may contain complete or partial electronic devices containing batteries. Other assorted waste may also be included in these containers.

Sorting

In an embodiment, the contents of the containers are sorted to separate the contents. The contents of the containers are emptied a rubber conveyer belt. As the conveyer belt moves slowly the contents are sorted into three categories: 1) WEEE (electronic) waste, 2) Burnable waste-wood, paper, plastic and 3) unusable waste.

As appropriate, outer plastic battery casing and packaging materials are removed from the battery. Employees, by hand, separate the outer plastic casing from the batteries. These casings may enclose either the battery or the battery installed in a product. The removed casings may be smelted to recover cobalt and other materials. In a non-limiting embodiment this process may be manually performed. The batteries are contained in the electronic waste and, with the exception of small lithium primary and alkaline batteries, are further sorted and separated into separate containers as follows:

a) Lead
b) Li-Ion, Polymer
c) Ni—Cd
d) Mercury
e) Ni-MH
f) Lithium (large primary)

Removing Small Lithium Primary Batteries

As part of the battery sorting process, small lithium primary batteries, or button cells, and alkaline batteries should be removed for proper operation of the recycling system. Button cell batteries are round, approximately a half-inch in diameter and an eighth of an inch in width. Their size makes them difficult to mechanically crush into pieces suitable for processing.

In an embodiment, the button cell batteries are removed by passing them through a metal sieve. This sieve consists of approx. 15 "V" shaped metal ridges, which are all connected such that the same piece of metal forms the left side of one ridge and the right side of another ridge. The left and right sides are at an approximately 45 degree angle such that any small object would fall to the middle of each ridge. The side of each ridge is approximately one inch long. The bottom of each ridge, what one could call the bottom of the "V," is empty. It is an open slot approximately one-quarter of an inch wide. Thus any small button cell battery that was on top of the "V" would slide to the bottom of the ridge, and then through it The metal bars which form the left side of one "V" and the right side of another are approximately each 10 feet long. These metal bars are placed directly next to a rubber conveyer belt of equal width.

The smaller lithium button cell batteries and alkaline batteries remain on the conveyer belt and thus pass from the conveyer belt to the metal "V" shaped ridges. The bars which form the sides of the ridges shake at a moderate pace. This encourages the smaller batteries to fall to the bottom of the ridge and then through the ridge. They then fall into boxes placed below the ridge.

The larger items that do not fall though the ridges are alkaline batteries which are the only batteries remaining on the conveyor belt may be readily gathered.

Crushing

Processing Lithium-Ion and Li-Polymer Batteries

Lithium-ion and Li-polymer batteries may contain Co, Ni, Cu, Al, C, as well as rare earth elements. These component materials may be recovered and recycled by a refining process.

First Crushing:

In an embodiment, once the batteries have been sorted, then either lithium-ion and lithium polymer batteries together, or nickel-metal-hydride batteries by themselves, will be put thought a crushing process. The crushing process commences with the batteries being placed on a first flat, rubber conveyor belt. This conveyer belt may be approximately 20 feet long. The batteries fall off the end of the first conveyor belt onto a second rubber conveyor belt.

This second rubber conveyor belt is tilted upward at an approximately 45 degree angle. In an embodiment, a slab of rubber is attached to the second rubber conveyer belt at intervals of approximately 1.5 feet. This slab is approximately 2 inches in height, and transverse the width of the conveyor belt. This rubber slab picks up the batteries as they fall off the first flat rubber conveyor belt. The second rubber conveyor belt may be approximately 20 feet long. The second conveyer belt delivers the batteries into the input of a first metal crusher.

In an embodiment, the first crusher rotates at approximately 100-400 revolutions per minute. These batteries are crushed (or chopped) by a device with teeth or blades of approximately 8 inches long. The blades or teeth cut into each battery, thereby breaking it into pieces approximately 0.5 to 1.0 inches in length. The operation of the first crusher may be monitored by a computer and the speed of the crusher may thereby be automatically adjusted to insure that the resulting battery pieces are of the desired size.

The temperature within the first crusher should be maintained between 40 and 50 degrees Celsius. The relatively low temperature minimizes the risk of fire.

During the first crushing process hydrogen and oxygen are released from the batteries. These gases should be removed from the crusher to minimize the risk of fire. A cyclonic air mover removes all of the gases, including hydrogen and oxygen, accumulated within the crusher. The cyclonic air mover may comprise a spinning blade at the top of a chamber that is tapered so it gets narrower as the gases moves towards the bottom of the chamber. This creates a tornado-like effect that blows the air containing the gases down, through the chamber of the air mover, and exhausts them out of the chamber.

The air containing the gases that is exhausted out of the air mover is then passed through a filter. The exhausted gases also contain light plastic and cardboard, which comprised the batteries and their packaging. This plastic and cardboard should be removed because they would interfere with the recovery of valuable materials during the cobalt refining process.

The filter removes the light plastic and cardboard that was suspended in the exhaust gases. The filtered light plastic and cardboard contains materials that may be recovered by a Nickel smelting process. Note that the heavy plastic, which, generally speaking, formed the outside casings of the batteries, remains mixed with the metal in the crushed battery mix.

This mixture of light plastic and cardboard is added to the process of recycling Nickel Metal Hydride batteries (see below). This light plastic and cardboard is thus sent, along with the other parts of the recycled Nickel Metal Hydride batteries, for Nickel smelting. The Nickel smelting operation removes the very small amount of cobalt (2-4%) in the mixture, particularly that which remains attached to the light plastic. The remainder is then sent for Cobalt processing.

After filtering, the air that contains the hydrogen and oxygen is exhausted to the atmosphere via a second filter. The second filter catches any remaining particles, insuring that only particulate-free air is released.

A filter screen positioned on the output of the first crusher has multiple apertures sized to insure that only pieces smaller than the desired maximum size are permitted to exit the crusher. After passing through this first crushing chamber, the mix of battery pieces and dust passes into a second transfer tube. While in this second transfer tube, the mix is cooled down to room temperature.

The second transfer tube is approximately 10 inches in diameter and is air-tight. The pieces and dust mixture will pass through this tube to the second crushing chamber.

Second Crushing:

The second transfer tube brings the dust to a second crusher. This crusher is of the same basic design as the first crusher but is made to operate at a higher rotational speed. It turns at 1,000-1,200 revolutions per minute and reduces the battery pieces to 0-6 mm.

The second crusher produces more dust that may be collected in a second cyclone air mover. This second cyclone has two dust filters having the same filtering properties as the second filter from the first cyclone.

A powder results from the second crushing of the battery pieces. The powder exits the second crusher and is placed on a "shaker-mover" device that, in an embodiment, may be implemented as a vibrating conveyor belt, which slowly shakes the powder so as to cause it to move forward. The powder moves approximately 2.5 meters along the vibrating conveyer belt. While the powder is on this conveyer belt it passes under the magnetic separator.

In an embodiment, the magnetic separator pulls the iron from the powder. This iron is in the form of flakes. The magnetic separator is positioned about 25 cm above the vibrating conveyor belt. The magnetic separator is approximately a half-meter wide and two and a half meters long. The key component of the magnetic separator is a magnet. The iron flakes are attracted to this magnet thereby be separated from the powder. A third conveyer belt is located below the magnet. The magnet behind the belt attracts and then holds the iron flakes onto the belt. The belt that carries the iron flakes out of the attractive magnetic field. In an embodiment the conveyor belt may be approximately 40 centimeters long. The flakes then fall off the end of the belt and into a container. The iron flakes may reclaimed by smelting.

The remaining powder, from which the iron flakes has been removed, may be refined to recover cobalt and copper that comprises over 93% of the powder.

Processing Nickel-Metal-Hydride Batteries

Nickel-metal-hydride (Ni-MH) batteries may comprise Ni, Co, Fe, Al, C, Cd, and rare earth elements. These component materials may be recovered and recycled by a refining process.

Nickel-metal-hydride (Ni-MH) battery recycle processing poses a minimal fire risk and expelled gases and dust need not be controlled. Processing of Ni-MH batteries may thus be accomplished by a single high rotation speed crushing operation. Here again, as with the second crushing operation described above, the crusher operates at a higher rotational speed of 1,000-1,200 revolutions per minute and reduces the battery pieces to 0-6 mm.

The light plastic and cardboard waste generated during the lithium ion, lithium polymer recycling process, described above, is mixed with the Ni-MH batteries as they are being recycled. This material is thus sold, along with the material that was derived from the Ni-MH batteries, to a nickel smelter. This smelter uses the light material as a energy, thus deriving energy from the light material derived from the lithium ion and lithium polymer batteries.

Processing Alkaline Batteries

Alkaline batteries contain caustic materials and mercury and should be processed in a manner that protects personnel, processing equipment and the environment from the deleterious effects of caustic alkaline and mercury content.

Alkaline batteries are separately crushed at room temperature to minimize the reactivity of mercury and the caustic electrolyte. As is the case for Ni-MH batteries, alkaline batteries are processed by a single high rotation speed crushing operation. The crusher operates at a rotational speed of 1,000-1,200 revolutions per minute and reduces the battery pieces to 0-6 mm. Alkaline battery materials are very corrosive. Machinery used for alkaline battery processing should therefore have surfaces made of rubber, stainless steel, or other rustproof materials.

After crushing, the iron which makes up 20-23% of the contents of an alkaline battery is magnetically separated. The iron may be recovered by a refining process. The material remaining after the iron is removed, called a black mass, contains approximately 25% zinc and 30% manganese which may be recovered by refining.

Alkaline batteries should be processed separately in a crusher that is sealed to the environment and includes provision for capturing all of the recovered mercury.

Reporting and Tracking System

In an embodiment, a computerized reporting and tracking system may be employed to track, record and report battery-processing operations.

In an embodiment, the following data is recorded upon receiving a shipment of batteries to be processed:

I. The name and ID number and contact of the each transport company.
II. The producers association or other entity on whose behalf the transport company transported the batteries,
III. The battery types were delivered, including if many kinds of batteries were mixed together.
IV. Cargo number as reflected in the shipment records such as the bill of lading
V. Pallet type (i.e., Fin or Euro)
VI. Battery packaging details.
VII. Gross and net weights A label that is printed and attached to each incoming container may include the following:

(a) Shipment number
(b) Pallet number
(c) Date the label was made
(d) The ID number of the employee entering the relevant data
(e) The originating company that sent the batteries
(f) Gross weight of all the containers on the pallet.
(g) Types of batteries that shipment contained, or if the batteries were of many types this is so indicated.
(h) Other relevant information.

After measuring and recording the type and weight of each shipment of batteries, computerized reporting and tracking system sends the originating company a payment or an invoice, as is appropriate. The payment amount is based, in part, on the current market price for the constituent materials.

Each of the subsequent recycling operations performed is entered into the computerized reporting and tracking system to maintain traceability.

Statement Regarding Embodiments

While the invention has been described with respect to embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

What is claimed is:

1. A method for recycling batteries, the method comprising:
   (i) sorting a plurality of batteries into groups by battery technology;
   (ii) removing button-cell batteries from said groups;
   (iii) chopping said groups of batteries into pieces approximately one quarter inch or less
   (iv) to produce final particulate matter;
   (v) removing ferro-magnetic material from said final particulate matter;
   (vi) transferring said final particulate matter to refining or smelting process to recover reusable materials; and
   wherein said chopping (iv) comprises:
   a first chopping into pieces of one inch or less wherein released gases are removed from said first chopping by a cyclonic air mover and crushing is performed at a temperature of between 40 to 50 degrees Celsius; and the resulting mix of battery pieces is passed through a transfer tube that is air tight to a second chopping into pieces of one quarter of an inch or less.

2. A method for recycling batteries, in accordance with claim 1, wherein said removing ferro-magnetic material is performed using a magnetic separator.

3. A method for recycling batteries, in accordance with claim 2, wherein said removing button-cell batteries step is performed by passing them through a metal sieve.

* * * * *